(No Model.)
D. A. BROWN.
VEHICLE AXLE.
No. 582,806.  Patented May 18, 1897.
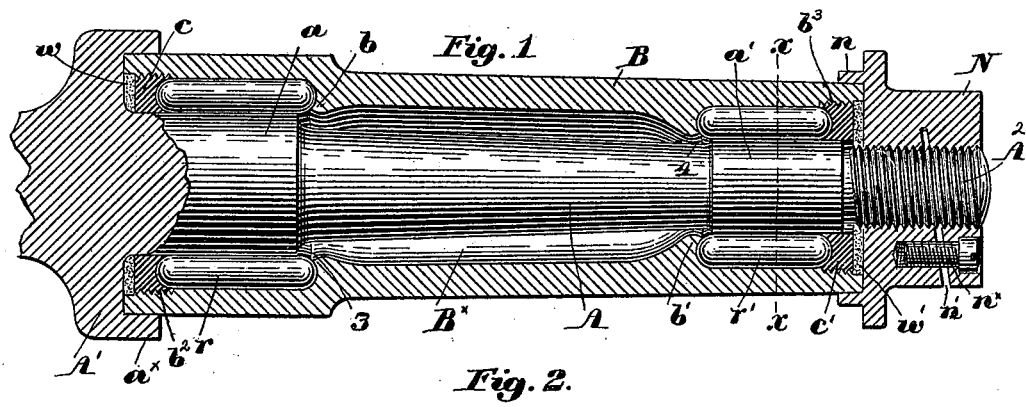
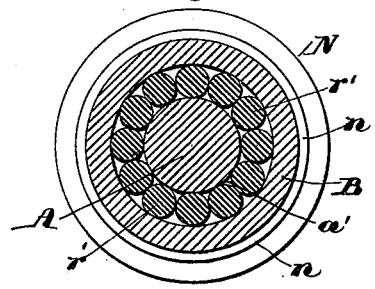
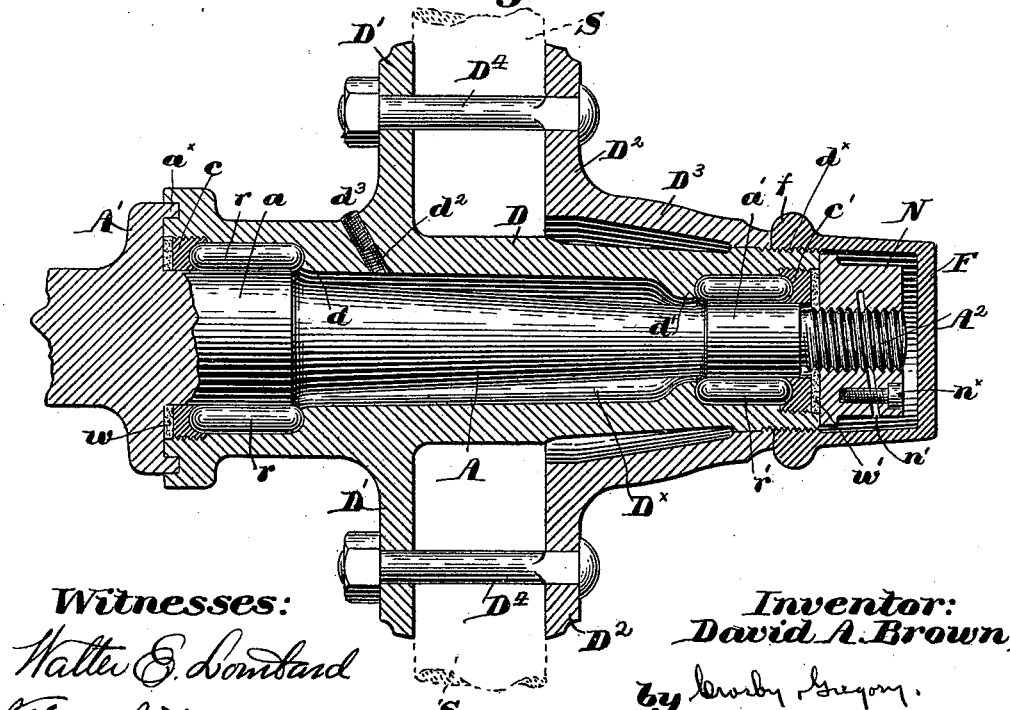
Witnesses:
Walter E. Lombard
Thomas J. Drummond
Inventor:
David A. Brown,
by Crosby & Gregory,
Attys.

UNITED STATES PATENT OFFICE.

DAVID ARTHUR BROWN, OF PENACOOK, NEW HAMPSHIRE.

VEHICLE-AXLE.

SPECIFICATION forming part of Letters Patent No. 582,806, dated May 18, 1897.

Application filed January 15, 1897. Serial No. 619,316. (No model.)

*To all whom it may concern:*

Be it known that I, DAVID ARTHUR BROWN, of Penacook, county of Merrimac and State of New Hampshire, have invented an Improvement in Vehicle-Axles, of which the following description, in connection with the accompanying drawings, is a specification, like letters and figures on the drawings representing like parts.

This invention has for its object the production of a novel roller-bearing axle for vehicles of very simple, strong, and efficient construction, whereby the number of parts is greatly reduced, the friction decreased, and the end thrust of the axle box or hub provided for.

Figure 1 is a longitudinal sectional view of a roller-bearing axle embodying my invention. Fig. 2 is a transverse sectional view thereof on the line $x\ x$, Fig. 1, looking toward the right; and Fig. 3 is a view similar to Fig. 1, but showing a metal wheel-hub in the place of the box shown in Fig. 1.

Referring to the drawings, the spindle A of the axle is shown as outwardly tapering between two cylindrical bearing portions $a$ and $a'$, the inner bearing $a$ being preferably somewhat larger in diameter. A flange A', of substantially usual construction, is secured to or forms part of the axle at the inner end of the spindle, the outer face of the flange being released to leave an overhanging annular lip $a^\times$.

In Fig. 1 the axle skein or box B is shown as having internal annular shoulders $b\ b'$, preferably concaved at their sides nearest the ends of the spindle, respectively, said shoulders being nearer together than the inner ends of the bearing-surfaces $a$ and $a'$. The skein is interiorly threaded at its ends at $b^2$ $b^3$, to receive threaded retaining-rings $c$ and $c'$, respectively, the inner circumferences of said rings fitting snugly but not tightly the bearing-surfaces of the spindle. The innermost face of each ring is concaved annularly, and between each ring and the shoulder of the skein nearest thereto are interposed a series of cylindrical hardened-steel rolls $r\ r'$, respectively, rounded or semispherical at their ends, to fit into the concavities of the shoulders and retaining members or rings, the latter serving to adjust the rolls. A washer $w$, of felt or similar material, is interposed between the ring $c$ and the flange A' of the axle, the inner end of the skein entering snugly within the annular lip $a^\times$, the washer effectually preventing the entrance of dust or dirt to the adjacent bearing.

The outer end of the spindle A is screw-threaded at A² to receive a lock-nut N, having an inturned annular flange $n$ to surround the outer end of the skein, while a dust-excluding felt or other suitable washer $w'$ is held between the retaining-ring $r'$ and the inner face of the nut. I have shown the nut N as partially cut or split across at $n'$, and a lock-screw $n^\times$ is threaded into the inner part of the open side of the nut and rotatable in the outer part. The nut having been adjusted, the screw $n^\times$ is tightened, crowding the two parts of the nut together and locking it on the spindle. It will be noticed that the ends of the skein B bear upon the flange A' and upon the inner face of the nut N, so that when the latter is adjusted all longitudinal play of the skein is prevented and the end thrust taken up. The rollers $r\ r'$ roll upon the cylindrical bearing-surfaces $a\ a'$ of the spindle, and the adjacent portions of the skein travel upon the rollers. The interior of the skein is hollowed out or enlarged, as at B$^\times$, to form a grease-receptacle, the lubricant being supplied to the bearings as needed through the annular spaces 3 4, formed between the shoulders $b\ b'$ and the spindle, it being noted that the rollers project slightly beyond the bearing-surfaces for this purpose.

It will be obvious that the parts of the axle-bearing described may be readily taken apart and replaced, the skein retaining the rollers when the spindle is withdrawn, that the parts are few in number, strong, and not liable to get out of order.

In Fig. 3 I have shown the skein D as very similar to the skein B in its main construction, it being provided with the internal roller-guiding shoulders $d$ and $d'$; but as the skein forms the hub of the wheel it is provided with an annular flange D', forming a spoke-support and coöperating with a removable flange member D², formed on a boss D³, which fits over the outer end of the skein, suitable bolts D⁴ securing the flanges together and holding the spokes S in place. In Fig.

3 the outer end of the skein D is threaded externally at $d^\times$ to receive a cap F, which fits over the lock-nut N, the latter having no internal annular flange, as shown in Fig. 1. The base of the cap F is preferably enlarged at $f$ to form an end bearing for the boss $D^3$, if desired. The skein D is hollowed out at $D^\times$ to form a receptacle for lubricating material, entrance thereto being had through a duct $d^2$, closed by a threaded plug $d^3$. In Fig. 3 the inner end of the skein is shown as annularly recessed to receive the lip $a^\times$ of the axle-flange A'.

Having fully described my invention, what I claim, and desire to secure by Letters Patent, is—

1. An axle-spindle provided with bearing-surfaces, a removable one-piece skein or box having internal, annularly-recessed shoulders, and internally threaded beyond said shoulders, threaded retaining members annularly recessed on their faces nearest said shoulders, and adjustably held in the internally-threaded portions of the skein, a series of antifriction-rolls held between said shoulders and adjustable retaining members, and traveling on the bearing-surfaces of the spindle, and means to prevent longitudinal movement of the skein on the spindle, substantially as described.

2. An axle-spindle having a flange at its inner end, and separated bearing-surfaces near its ends, a one-piece skein or box interiorly threaded at its ends and recessed to form roll-seats, threaded retaining-rings adjustably secured in the threaded portions of the skein, outside of the seats, antifriction-rolls held by said members in the skein and adapted to travel on the bearing-surfaces of the spindle, a washer adjacent the outer face of each retaining member, and a locking-nut adjustably mounted on the outer end of the spindle, to coöperate with the flange on the inner end of the latter and prevent longitudinal movement of the skein, substantially as described.

In testimony whereof I have signed my name to this specification in the presence of two subscribing witnesses.

DAVID ARTHUR BROWN.

Witnesses:
   EDMUND H. BROWN,
   LORENZO M. CURRIER.